July 4, 1939. J. H. SAARELA 2,165,071
FISH LURE
Filed June 1, 1938
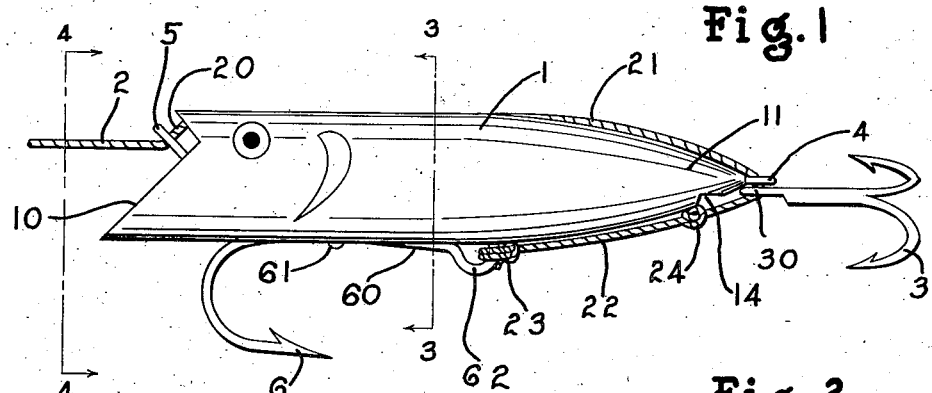
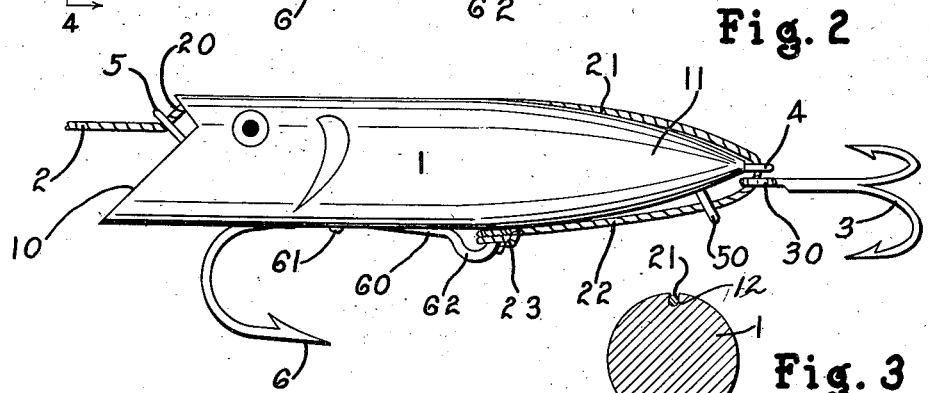
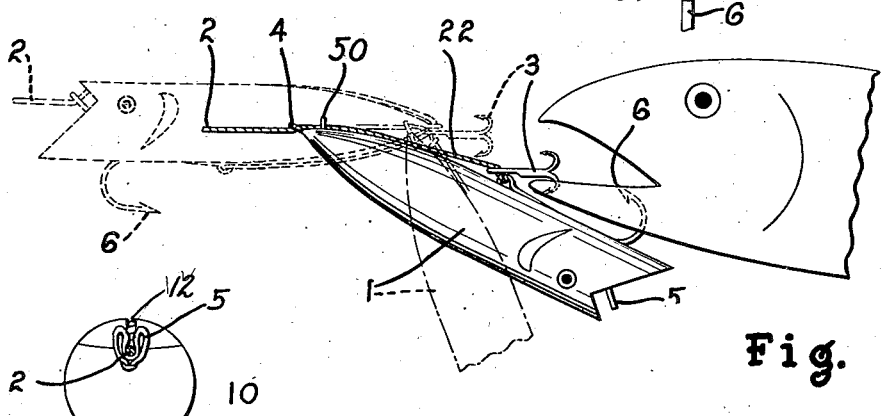
Inventor
John H. Saarela
By Charles L. Reynolds
Attorney Patented July 4, 1939

2,165,071

UNITED STATES PATENT OFFICE 2,165,071

FISH LURE

John H. Saarela, Seattle, Wash.

Application June 1, 1938, Serial No. 211,164

13 Claims. (Cl. 43—46)

My invention relates to a fish lure, and is best embodied in a lure of the type termed a plug.

A primary object of the present invention is to provide a lure of simple construction, with parts so formed and organized that when a fish strikes the plug the body of the plug will automatically and promptly reverse its position end-for-end, will by such reversal position a gaffing point which it carries behind and preferably beneath the fish's lower jaw, and, thus reversed, will immediately move in the direction of its length, to advance the gaffing point, moving with the plug, to gaff the hooked fish in the lower jaw. The fish is both hooked in the normal manner and gaffed by a second point, and is thus unable to escape.

It is a further object to provide such a lure so arranged that, when the fish is hooked and gaffed, the line will be connected directly to the shank of the gaffing point, and no strain will be transmitted through the body of the lure.

With these and other objects in view, as will appear hereafter, my invention comprises the novel lure and the novel parts and relative arrangement thereof, as shown in the accompanying drawing, described in this specification, and as will be more particularly defined by the claims which terminate the same.

In the accompanying drawing I have shown my invention embodied in forms of construction such as are at present preferred by me.

Figure 1 is a side elevation of the preferred form of the lure, shown in normal or draft position, and Figure 2 is a similar view showing a slight modification.

Figure 3 is a transverse section on the line 3—3 of Figure 1, and Figure 4 is a front elevation with the viewpoint illustrated by the line 4—4 of Figure 1.

Figure 5 is a side elevation, showing in dash lines, in dot-dash lines, and in full lines, respectively, the three positions the lure would occupy during draft, at the instant of a strike, and immediately thereafter, a fish being shown in the final position engaged with and by the lure.

The body of the lure may be of any suitable material, for instance wood, painted and shaped as may be desirable, and need depart in no respect in such particulars from an ordinary plug. However, the body of the lure may be made of other materials, may be jointed, somewhat flexible, or rigid, and in general may take any desired shape, and be made of any desired material. This body 1, as herein shown, is provided with the usual head end 10 having water engaging surfaces to effect or control movement of the body through the water during draft, and the usual tapering tail end 11. In general its shape and appearance simulate a small fish or other bait, and such simulation may be increased by its action. My invention, however, does not lie in these fields, and is applicable to many types of body (perhaps differing from each other in these particulars), but lies rather in the action of the body and associated parts after a "strike."

The line 2 extends from ahead of the body to the head end 10, preferably along a line somewhat beneath the top of the body, and there it is kinked upwardly, as shown at 20, to the level of the top of the body, and thence it extends over the top and rearwardly, as indicated at 21, to the tail end. There it may be secured to the body, but preferably it extends through a guiding eye 4 at the extreme tail end of the body, and thence forwardly, as indicated at 22, beneath the belly to a terminus or point of securement as indicated at 23, intermediate the head and tail ends of the body.

A trailing hook 3, of any suitable design, is located at the tail end of the lure, preferably trailing somewhat behind the same. Its eye 30 is so engaged with the body that the hook may swing and pivot on this eye relative to the body, and so that the eye is also guided for movement lengthwise of the body. Any suitable means to this end may be employed. If the line 2 is extended from the tail at 11 forwardly beneath the belly, as indicated at 22, this extension 22 may be threaded through the eye 30, and this serves to permit pivotal movement of the hook 3 relative to the body, and also to guide the eye 30 for movement lengthwise of the body.

Reversal of the body 1, end for end, is accomplished by reason of the fact that the line 2 is engaged with means such as the clip 5, where it is secured to the head end of the body, this securement preferably kinking the line at 20, as noted above, the engagement of the line with the clip being a frictional one, when appreciable tension is transmitted to the line 2, as by a fish striking at the hook 3 or at the lure, the line will tend to straighten, the main portion 2 coming into line with the portion 21 and disengaging the line from the clip at 5. Once it is disengaged and the kink at 20 is straightened out, there is nothing to hold the head end of the body to the line, but the tail end of the body is still held to the line by the member at 4, through which the line is guided to run or to which it may be secured. Accordingly, this release of the head end of the lure, coupled with the water action, creates a tendency to reverse the body end for end, and this tendency is assisted by the fact that the hook 3, engaged in the fish's mouth, pulls somewhat off the axial line of the lure upon the line 2 or its extension 22, and this further assists the tendency of the body to reverse itself, with the result that such reversal takes place extremely rapidly. The dash lines in Figure 5 show the normal or draft positions of the parts, and a position during reversal is illustrated in dot-dash lines in that view.

During such reversal, or when it is nearly completed, the hook 3, which is being pulled by the fish to the rear, slides along the extension 22 towards the reversed head end of the body, until such movement is stopped by the anchorage of the extension 22 at 23. This relative lengthwise movement between the hook 3 and the body 1 is taken advantage of to secure a gaffing action, and to this end a gaffing point 6 is provided, supported from the body 1 and spaced beneath its belly portion, and directed towards its tail 11. This gaffing point 6 may be part of a large hook, the shank 60 of which is received within a groove (see Figure 3) in the bottom of the body 1, being held in place by screws or rivets 61, and the anchorage of the line at 23 may be formed by the eye 62 of the hook 6. Upon such relative movement of the hook 6 and the hook 3, as the latter slides along the extension 22, the hook 6 engages beneath the jaw of the fish, as shown in full lines in Figure 5, gaffing the fish and materially assisting in landing it. If the line is extended as at 22, and this extension is connected to the eye of the hook 6, as is preferred, it will be observed that in the reversed position of the lure, shown in Figure 5, the line has substantially direct draft to the hook 6 which principally engages the fish.

There are two actions described above, the first a reversal of the body 1 and gaff hook 6, pivoting about a point to reach a position wherein the point of the hook 6 points forwardly and is adjacent or to the rear of hook 3, and the second a subsequent relative approach of the hooks 3 and 6. The reversing action, by proper arrangement and proportioning of the parts, may alone be sufficient to gaff the fish hooked on the hook 3, but I prefer that there be also the second action, to doubly insure gaffing the fish, by movement of the point of hook 6 in a line directly towards the under side of the fish's throat, rather than in an arcuate path, as it would move during reversal. However, since the line, to the extreme rear end of which the reversed hook 6 is directly connected, is being held against rearward movement, or is being actively pulled in by the fisherman, it is not strictly correct to describe the hook 6 as fixed and the hook 3 as movable. Actually they probably mutually approach one another. This being true, it is immaterial which hook is considered, or is actually fixed, and which is considered, or is actually movable. The principles of my invention may be embodied in any suitable arrangement which, primarily, accomplishes reversal of such a normally rearwardly directed hook as 6, automatically by a pull on the line as when a fish strikes the other hook, as 3, to a forwardly directed position at the rear of or adjacent the hook 3 to gaff a fish hooked on the latter, and secondarily and additionally if needed or desired, accomplishes relative approach of the reversed hook 6 and the hook 3. These principles may be embodied in any suitable form or arrangement of parts.

It is desirable that the hook 3 be not permitted to move lengthwise until the reversal of the lure has been substantially completed, to position the gaffing point 6 properly for engagement of the fish, as otherwise there might be no relative lengthwise movement remaining by the time the gaffing point 6 has reached a position to penetrate the fish's jaw. Accordingly, in order to delay the lengthwise movement of the hook 3, pending pivotal reversing of the body, any suitable means are provided. Thus in Figure 1 a knot 24 is provided in the extension 22 between the member 4 and the anchorage at 23. The eye of the hook momentarily engages the knot 24 and pivots thereabout, the tail portion 11 being notched as indicated at 14 to give its eye 30 complete freedom, and yet the knot is not so large but what it will ultimately pass through the eye 3, but by the time this occurs the body 1 is substantially completely reversed, and the gaffing point 6 is in position to operate. A somewhat similar result is obtained in the form shown in Figure 2 by providing a friction clip 50, identical in structure to the clip 5, with which the line is releasably engaged, whereby the hook 3 may pivot about this clip 50, but continued pull on the hook will release the line from this clip and permit the shank 30 to slide to the anchorage or terminus at 23.

In order to protect the line against severance by the fish, should the fish attempt to swallow the entire plug, it is preferred that the upper run 21 of the line, at least in the cylindrical portion of the body, be recessed in a groove 12 provided for the purpose.

While the invention is designed to be incorporated in a rigid plug of solid material and of appreciable cross-section, it may be embodied in other types of lure, or other styles of plug. The plug need not have a solid body, although it is preferable that the body be solid or rigid, yet this will not exclude a jointed plug or a plug made of somewhat flexible material, nor, insofar as concerns the broad general principles of my invention, will it exclude a lure made of a sheet of metal shaped in a desired form.

What I claim as my invention is:

1. A fish lure comprising a solid body of suitable shape, a line extending rearwardly over the head end and back to a pivotal point adjacent the tail end, and secured to the body, a clip on the head end of the body engageable with the line, and releasable by tension in the line, whereby the body may reverse itself and pivot about such pivotal point, a trailing hook disposed at the tail end of the body, means whereon the shank of the hook is guided for pivotal movement and for relative sliding movement, upon reversal of the body, along the belly towards the head end of the body, and a rearwardly directed point spaced beneath the belly, in position to engage from below the jaw of a fish hooked on the trailing hook, as the latter slides towards the head end of the body.

2. A fish lure comprising a solid body of suitable shape, a line extending rearwardly over the head end and back to a pivotal point at the tail end, and secured to the body, means at the head end engageable with the line to kink the same, and to draw the body head first through the water, said means being disengageable by tension in the line, and means at the pivotal point to effect reversal of the body about such point upon disengagement of the line kinking means, and to draw the body tail first through the water, gaffing means carried by the body and directed forwardly upon the latter's reversal, and a hook carried at the tail end of the body, and pivotally reversible to maintain its original position, upon reversal of the body.

3. A fish lure comprising a solid body of suitable shape, a line extending rearwardly over the head end and back and around the tail end of the body, and fixed to the body at a terminus upon the belly side of the lure, between its head and tail ends, a clip engageable with the line at the head end and disposed to kink the line, and releasable by tension in the line, a guide at the tail end through which the line may run and about which the body may pivotably reverse itself upon release of the line by said clip, a trailing hook the eye whereof is threaded on and slidable along the line, between the tail end guide and the belly terminus, and a rearwardly directed gaffing point spaced below the body, forward of the line's terminus, the sliding movement of the trailing hook effecting approach of said gaffing point towards the hook, upon reversal of the body.

4. A fish lure comprising a solid body of suitable shape, a line extending from ahead of the body rearwardly to its head end, thence over its top to its tail end, and thence forwardly beneath its belly to an intermediate point, a hook, the point of which is beneath the belly and directed rearwardly, secured to the underside of the body, the end of the line being secured directly to the eye of said hook, a clip at the head end with which the line is releasably engaged to hold the draft in line with the body, and out of line with that portion which extends over the top of the body, said clip being releasable by tension tending to straighten the line, a guide at the tail end of the body through which the line may run, and about which the body may pivotably reverse itself, upon release of the line from said clip, and a trailing hook through the eye whereof is threaded that portion of the line which lies between the guide and the eye of the fixed hook, whereby upon reversal of the body the trailing hook may slide towards the point of the fixed hook, and the draft will come from the line directly upon the eye of the fixed hook.

5. A fish lure comprising a solid body of suitable shape, a line extending rearwardly over the head end and back to a pivotal point adjacent the tail end, and secured to the body, a clip on the head end of the body, engageable with the line, and releasable by tension in the line, whereby the body may reverse itself and pivot about such pivotal point, a trailing hook disposed at the tail end of the body, means whereon the shank of the hook is guided for pivotal movement and for relative sliding movement, upon reversal of the body, along the belly towards the head end of the body, a normally rearwardly directed gaffing point carried by the body, spaced beneath the belly, and directed forwardly upon reversal of the body, to gaff a fish hooked upon the slidably and pivotably mounted trailing hook, and means to delay sliding movement of the trailing hook until it has largely completed its pivotal movement.

6. The combination of claim 5, wherein the eye of the trailing hook is threaded upon a cord extending along the belly forwardly from the body's pivotal point at the tail, constituting the slidable and pivotal mounting of the trailing hook, and wherein the cord has a knot therein adjacent the tail end, of a size to delay sliding movement of the hook's eye, and to induce pivotal movement of the hook, but of insufficient size to prevent its ultimate passage through the eye, thus constituting the means to delay sliding movement.

7. The combination of claim 5, wherein the line extends from the tail end of the body forwardly beneath the belly to an intermediate point of securement to the body, and wherein the eye of the trailing hook is threaded upon such extension, to slide towards the point of securement upon reversal of the body, and a second clip releasably engaging the line's extension, between said point of securement and the tail end of the body, the second clip constituting the means to delay sliding movement of the trailing hook.

8. A fish lure comprising a body, means to engage a line for draft releasably to the head end thereof, and nonreleasably to the rear end thereof, whereby the body may reverse itself upon release of the head end engagement, a hook trailing behind said body for hooking the fish, and a gaffing point supported beneath the body, and engageable with a hooked fish upon reversal of the body.

9. A fish lure comprising a body, means to engage a line for draft releasably to the head end thereof, and non-releasably to the rear end thereof, whereby the body may reverse itself upon release of the head end engagement, a hook trailing behind said body for hooking the fish, a gaffing point disposed beneath the body, and means operable with reversal of the body to effect relative movement, lengthwise of the body, between the hook and the gaffing point, to gaff the hooked fish.

10. The combination of claim 9, the line extending from the tail end of the body to the shank of the gaffing point, and extending in substantially a straight line to the latter upon reversal of the body.

11. In a fish lure, in combination, a draft line, a hook trailing therefrom, a gaff hook mounted for pivoting about a point adjacent the eye of the first hook, and releasable means normally holding said gaff hook rearwardly directed, forwardly of the first hook, the several parts being so organized and arranged that upon release of the gaff hook the latter pivots and gaffs a fish hooked upon the first hook.

12. In a fish lure, in combination, a draft line, a hook trailing therefrom, a gaff hook mounted for pivoting about a point adjacent the eye of the first hook, and for bodily approach towards the latter, and means, releasable automatically by a pull on the first hook, normally holding said gaff hook rearwardly directed, spaced forwardly from the first hook, the several parts being so organized and arranged that upon release of the gaff hook the latter pivots to the rear of the first hook and is directed forwardly, and thereafter moves forwardly and gaffs a fish hooked upon the first hook.

13. In a fish lure, in combination, a draft line having its extreme rear end directed forwardly, a hook trailing from the rear end of the bend thus formed, and movable along the line, a gaff hook secured to the extreme end of the line, means, releasable automatically by a pull on the first hook, normally holding said gaff hook rearwardly directed, and spaced forwardly from the first hook, and means operable upon release of the gaff hook to effect, in succession, reversal of the gaff hook to a forwardly directed position in rear of the first hook, and then relative approach of the two hooks, the first hook moving along the line towards the gaff hook, to gaff thereby a fish hooked upon the first hook.

JOHN H. SAARELA.